United States Patent [19]

Schilling

[11] 4,427,102
[45] Jan. 24, 1984

[54] FLUID ENGAGED AND SPRING RETURNED FAN CLUTCH

[75] Inventor: Hugh K. Schilling, St. Paul, Minn.

[73] Assignee: Horton Industries, Inc., Minneapolis, Minn.

[21] Appl. No.: 280,993

[22] Filed: Jul. 6, 1981

[51] Int. Cl.³ .................. F16D 13/48; F16D 13/44
[52] U.S. Cl. .............................. 192/85 A; 192/88 A
[58] Field of Search ............ 192/85 A, 85 AA, 85 R, 192/88 R, 88 A; 92/99, 101

[56] References Cited

U.S. PATENT DOCUMENTS

| | | | |
|---|---|---|---|
| 3,273,470 | 9/1966 | Bradley | 92/101 |
| 3,505,982 | 4/1970 | Walter et al. | 92/88 A |
| 3,782,516 | 1/1974 | Frisby et al. | 192/85 AA |
| 4,193,485 | 3/1980 | Johns | 192/88 A |
| 4,355,710 | 10/1982 | Schilling | 192/85 A |

Primary Examiner—John E. Murtagh
Assistant Examiner—Richard E. Chilcot, Jr.
Attorney, Agent, or Firm—Wicks & Nemer

[57] ABSTRACT

A fluid engaged and spring returned fan clutch for connection with a live rotative source of power including an annular mounting flange for connection with the source of power. The mounting flange terminates in a hub. Also included is an annular friction flange connected to the hub. A first outer shell section is rotatively mounted on the hub and connected to a second outer shell section with fan blades connected thereto. A circular face plate is connected to the second outer shell. A circular piston is axially and slideably mounted on and within the second outer shell section and axially of the face plate thereby forming a cylinder void between the piston and the face plate. A circular resilient bladder member is secured at its peripheral edge portion between the second outer shell section and the face plate with the bladder adjacent the piston and opposed to the face plate. The piston has a ring of friction material connected thereto. A series of spaced springs are mounted between the first outer shell section and the piston for urging the ring of friction material from the friction flange. Fluid pressure is introduced by means of a rotary air union into the cylinder void between the face plate and the bladder to cause the friction material ring to engage the friction flange to thereby rotate the first and second outer shell sections and the fan blades carried thereby against the action of the springs.

10 Claims, 3 Drawing Figures

FLUID ENGAGED AND SPRING RETURNED FAN CLUTCH

SUMMARY

The invention relates to an improvement in a fluid operated clutch having a cylinder in which a piston is actuated, and more particularly, to the sealing of the piston relative to the cylinder.

In known clutches, sealing contact between a piston and a cylinder is made by an O-ring mounted in a groove so as to make sliding sealing contact with a cylinder wall in which the piston is moved. In the use of O-rings, close tolerances must be built into the grooves, and the rings and the surface finish of the cylinder contacted by the O-ring. Additionally, the O-ring causes axial friction as the piston is slideably moved.

It is, therefore, an object of the invention to provide a circular resilient bladder member secured between the piston and the cylinder thereby sealing the cylinder into which fluid pressure is introduced and the bladder maintains the sealing as the piston is moved in the cylinder. Such construction gives a minimal amount of axial friction as the piston is moved, provides simplicity of construction and reduces cost of manufacture.

In the drawings forming part of this application:

Figure 1:
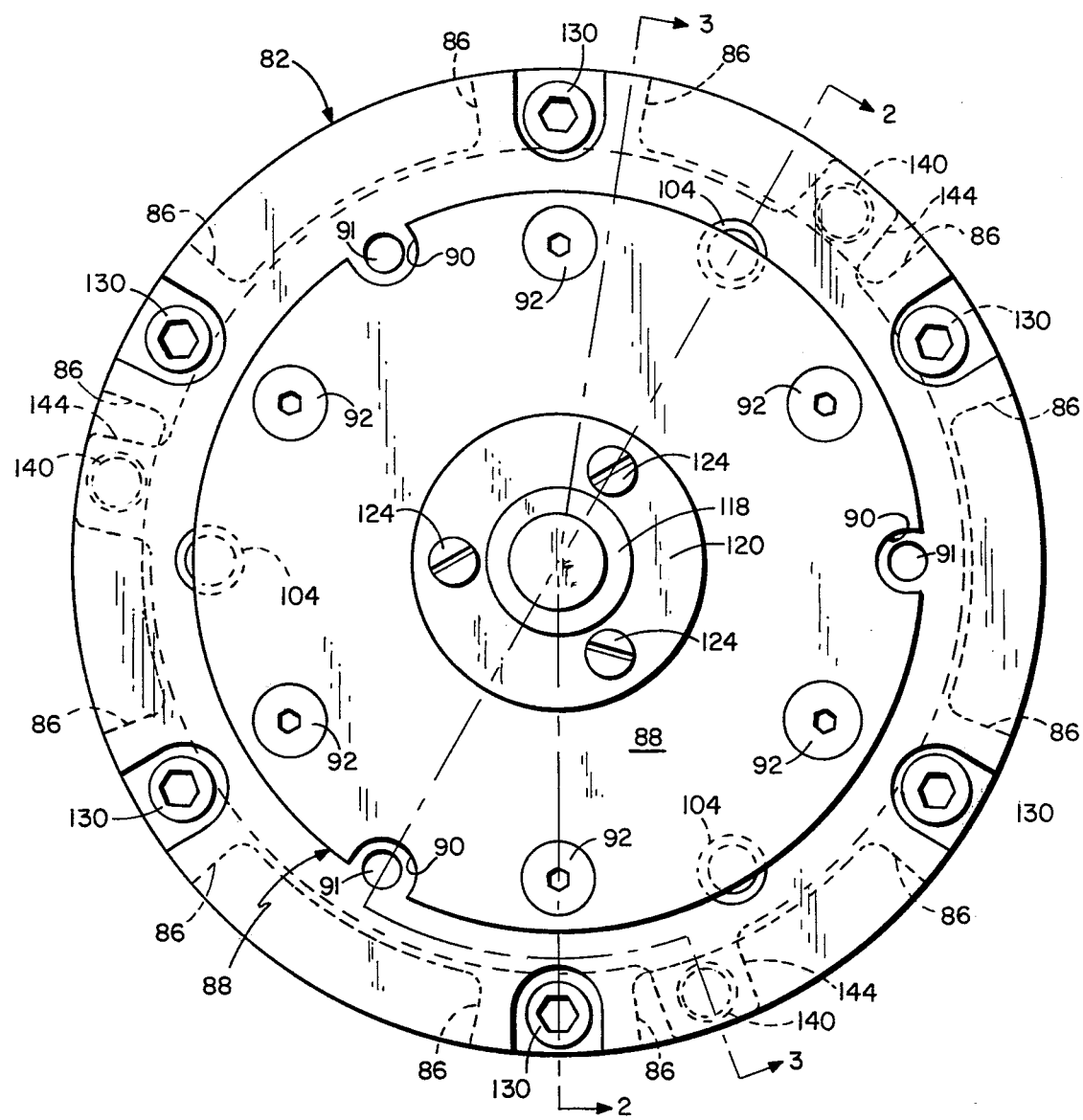
FIG. 1 is an end view of a fluid engaged spring returned fan clutch for a live shaft and embodying the invention.

Referring to the drawings in detail, the clutch A includes the circular mount 12 which includes the annular flange 14 formed with a series of spaced holes 16 for bolting the mount 12 to the sheave S by means of bolts 18. Sheave S is one form of a driven member and it is secured to the live stub shaft 20 rotated by conventional mechanism, not shown, within the engine block B whereby the sheave and mount 12 are rotated. The flange 14 terminates radially inwardly in the hub 22 formed with the outer axial bore 24 which terminates in the intermediate axial bore 26 which in turn terminates in the inner axial bore 28. The inner end of the hub 22 is formed with splines 29.

The hub 22 has formed therein the annular outer recess 30 in which the inner race 32 of the double bearing 34 is mounted. The numeral 36 designates a first outer shell section which includes the annular hub 38 in which is formed the inner annular recess 40 and in which is mounted the outer race 42a of the bearing 34. The hub 38 terminates in the radially extended body portion 42 which in turn terminates in the annular offset right angular flange 44. Formed in the recess 40 is the annular groove 46 in which is positioned the snap ring 48 against which the outer bearing race 42 abuts.

The numeral 50 designates a friction flange which includes the annular body portion 52 of a diameter less than that of the annular flange 44. The flange body portion 52 terminates radially inwardly in the internally splined axial bore 54 which meshes with the splines 29 which connects the flange 50 with the hub 22 for torque transmission Bore 54 is formed with the annular recess 56 which forms the annular shoulder 58. Further provided is the circular nut fastener 60 including the annular flange 62 which terminates radially inwardly in the cylindrical body portion 64 having the inner threaded bore 66.

The outer axial bore 24 terminating in the intermediate axial bore 26 forms the shoulder 68. Further provided is the bolt 70 which is extended through the bore 26 with the inner threaded end in threaded engagement with the threaded bore 66 of the nut fastener 60 and with the head of the bolt in engagement with the shoulder 68, and as the bolt is drawn up, the flange 62 of nut fastener 60 engages the shoulder 58 of friction flange 50 with the annular flange 72 in abutment with the inner race 32 of bearing 34. As the bolt 70 is drawn up, the head thereof abuts the shoulder 68.

The numeral 74 designates a circular piston having a ring of friction material 76 secured on the inner face thereof by conventional means, the outer diameter of which is substantially equal to the outer diameter of the annular friction flange 50. The piston 74 has formed on the outer face thereof the annular recess 78 which forms the annular shoulder 80. Also provided is a second annular outer shell housing 82 which has an annular face portion 84 which terminates radially outwardly in right angular spaced flange portions 86.

Further provided is the circular face plate 88 forming a cylinder wall formed with a series of spaced openings 90 on the periphery thereof for the purpose of exposing threaded holes 91 for the purpose of accepting a manually hand engagement bolt 95 supplied as a loose accessory which when tightened in hole 91 causes the friction ring on the piston to engage the friction flange to engage the clutch during the loss of fluid supply. The face plate is secured to the flange portions 84 by means of bolts 92 thereby forming a cylinder void C between the piston 74 and the face plate 88. A circular resilient rubber bladder member 93 is provided which is secured adjacent its outer periphery between the flanges 84 and the face plate 88 by means of the bolts 92 thereby sealing off the cylinder void C at the outer edge. The bladder is formed with the pleat 94 adjacent the periphery thereof to allow for expansion thereof and to compensate for axial movement of the piston 74. In movement of the piston 74, as hereinafter described, the bladder expands therewith while still maintaining sealing of the cylinder void C.

The piston 74 is mounted for axial movement by means of a series of spaced pins 96 securely mounted at the reduced end portion 98 thereof in holes 100 of the piston with each of the enlarged end portions 102 slideably mounted in a busing 104 mounted in a hole 106 in the face portion 84. The annular shoulder 80 of the piston slides past the inner annular shoulder 108 of the annular face portion 84.

The circular face plate 88 is formed with the axial hole 110 which terminates in the enlarged axial hole 112 thereby forming the shoulder 114 against which the O-ring 116 is positioned which makes sealing engagement with the conventional and stationary rotary air union 118 thereby completely sealing off the cylinder void C. The air union is held in the holes 110 and 112 by means of the ring 120 in abutment with the shoulder 122 of the air union by means of the bolts 124 secured in the face plate 88. The air union has the outlet hole 126 for delivering fluid pressure into the cylinder void C by means of a supply thereof (not shown) to the air union by means of the supply line 128.

The flange portions 86 are secured to the right angular flange 44 by means of a series of nut-equipped spaced bolts 130 extended through holes 132 formed in flange portions 86 and holes 134 formed in flange 44. The bolts also secure the fan blade ring 136 from which spaced fan blades BL radially extend.

Figure 3:
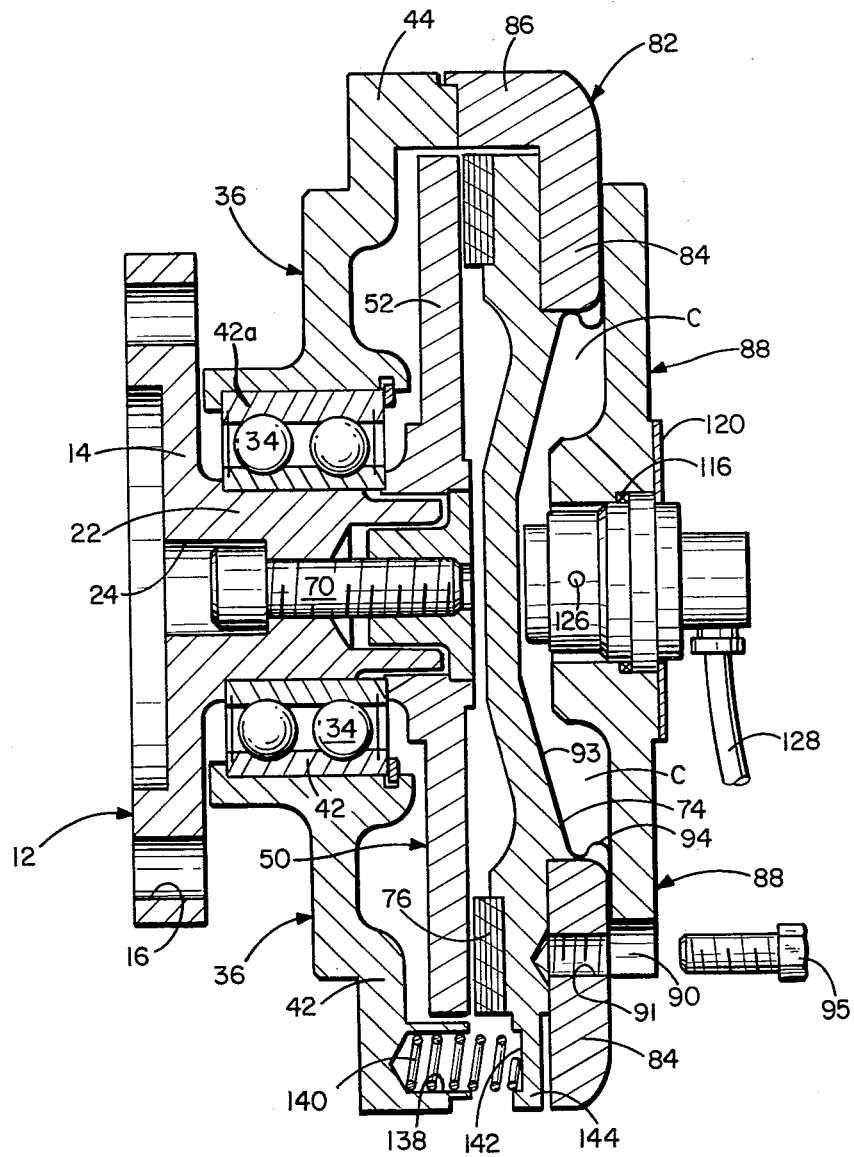
FIG. 3 is a sectional view on the line 3—3 of FIG. 1.

The annular flange 44 is formed with a series of spaced holes 138, FIG. 3, in each of which is positioned one end of a return coil spring 140 with the other end of each spring positioned in a recess 142 of one of spaced flanges 144 extending radially outwardly of the circular piston 74, also FIG. 3, thereby urging the friction facing ring 76 out of engagement with the friction flange 50.

Figure 2:
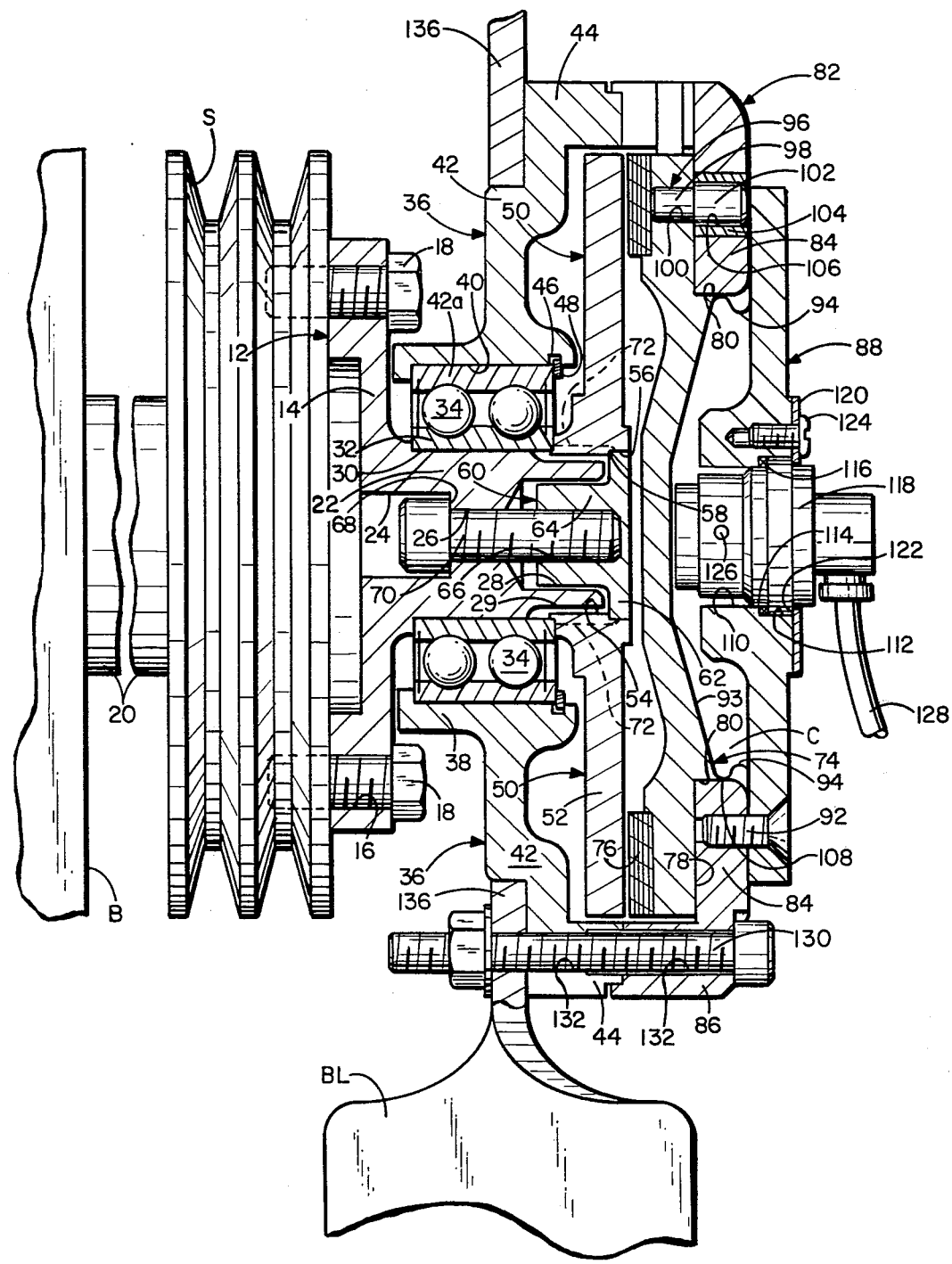
FIG. 2 is a sectional view on the line 2—2 of FIG. 1.

In FIGS. 2, and 3, the friction ring of the piston is shown as disengaged from the annular friction flange 50 due to the urging of the return springs 140 and no fluid pressure in the cylinder C. With the stub shaft 20 being rotated and live and connected to the mount 12 through the sheave S, the mount 12 is thereby live and as a result, the friction flange 50 is rotated. With the fluid pressure supplied to the air union 118 with an exit thereof out the outlet hole 126 and into the cylinder void C, the piston is moved axially whereby the friction ring 76 is caused to engage the friction flange 50 against the action of the return springs 140. As a result, the outer shell section 36 and shell housing 82 with the fan blades thereon are rotated. With the fluid pressure relieved, the springs disengage the friction ring 76 from the friction flange 50 and the rotation of the blades ceases. In some cases of application, the shaft 20 may be dead and the live power to mount 12 is through belt driven sheave S connected to mount 12.

In the event of a failure in the fluid supply or a rupture in void C, a series of spaced bolts are provided which are each mounted in a threaded hole 91 in flange portions 84 whereby when the bolts are extended against the piston the piston is moved axially so as to cause the friction ring thereon to mechanically engage the friction flange whereby the clutch interface is locked in without fluid pressure.

Although the bladder construction disclosed is shown as applied to fan clutch, it may be applied to clutches and brakes used for tension control having a cylinder void in which a piston moves and which requires a sealing of the piston relative to the cylinder. The distinct benefit is that the bladder provides a minimum amount of axial friction, the result being that the torque output of a clutch or brake is immediately responsive to the fluid pressure change in the cylinder void. In use of the bladder construction disclosed, there is no O-ring to wedge into the recess between the piston and cylinder as a result of applied fluid pressure in the cylinder. Such wedging action of an O-ring retards the release of braking or clutching surfaces, the O-ring piston sealing being less responsive to a change in cylinder pressure, the responsiveness being highly desirable in a tension control brake or clutch.

Having thus described the invention, what is claimed as new and desired to be secured by Letters Patent is:

1. A fluid engaged spring released fan clutch comprising:
    (a) an annular mounting flange for connection with a live rotative source of power,
    (b) said flange terminating in a hub,
    (c) an annular friction flange,
    (d) means connecting said annular friction flange to said hub,
    (e) a first outer shell section,
    (f) means rotatively mounting said first outer shell section on said hub,
    (g) a second outer shell section having a series of fan blades connected thereto,
    (h) means connecting said first outer shell section to said second outer shell section for rotation therewith,
    (i) a circular face plate,
    (j) means securing said face plate to said second outer shell section,
    (k) a circular piston,
    (l) a friction material ring connected to said piston,
    (m) means slideably and axially mounting said piston on and within said second outer shell section and axially of said face plate thereby forming a cylinder void between said piston and said face plate,
    (n) a circular resilient bladder member,
    (o) means securing the peripheral edge portion of said circular resilient bladder member between said second outer shell section and said face plate with said resilient member adjacent said piston and opposed to said face plate,
    (p) spring means,
    (q) means mounting said spring means between said first outer shell section and said piston for urging said friction material ring on said piston from said friction flange,
    (r) means for introducing fluid pressure between said face plate and said resilient member to cause said friction material ring to engage said friction flange to thereby rotate said first and second outer shell sections and fan blades carried thereby against the action of said spring means.

2. The device of claim 1, in which said means connecting said annular friction flange to said hub includes
    (a) a bolt carried by said hub for engagement by
    (b) a nut fastener carried by said friction flange.

3. The device of claim 2, in which said means rotatively mounting said first outer shell section on said hub includes,
    (a) said first outer shell section having a hub formation positioned radially and axially of said hub of said mounting flange, and
    (b) bearing means mounted between said hub of said mounting flange and said hub of said first outer shell sections.

4. The device of claim 1, in which said means rotatively mounting said first outer shell section on said hub includes
    (a) said first outer shell section having a hub formation positioned radially and axially of said hub of said mounting flange, and
    (b) bearing means mounted between said hub of said mounting flange and said hub of said first outer shell sections.

5. The device of claim 3 in which said means slideably and axially mounting said piston on and within said second outer shell section and axially of said face plate includes
    (a) an inner annular shoulder formed on said piston slideable on
    (b) an inner annular shoulder formed on said second outer shell section.

6. The device of claim 1 in which said means slideably and axially mounting said piston on and within said second outer shell section and axially of said face plate includes
    (a) an inner annular shoulder formed on said piston slideable on
    (b) an inner annular shoulder formed on said second outer shell section.

7. In a device having a circular wall and a circular piston, the invention comprising, in combination: means mounting said wall and piston forming a circular cylinder, said piston slideable on said mounting means relative to said circular wall, a circular resilient bladder interposed between said wall and piston and secured at its peripheral edge between said mounting means and said cylinder wall to seal said cylinder.

8. The device of claim 2 wherein said means connecting said annular friction flange to said hub further comprises, in combination: splines formed on said hub of the annular mounting flange, and the annular friction flange including an internally splined axial bore which meshes with the splines of said hub.

9. In a device having a circular wall and a circular piston, with the invention comprising, in combination: an annular portion including an inner annular shoulder and a front annular face; with the piston including an annular shoulder, with the annular shoulder of the piston being slideably mounted on the annular shoulder of the annular portion; a resilient bladder having a peripheral edge; and means for securing the circular wall to the annular face of the annular portion, with the peripheral edge of the resilient blader being located and secured between the annular face of the annular portion and the circular wall thereby forming a cylinder void between the piston and the circular wall, with the resilient bladder sealing the cylinder void.

10. The device of claim 9, in which said bladder has an annular pleat formed adjacent the periphery thereof to allow expansion of said bladder.

* * * * *